_United States Patent Office_

3,544,304
Patented Dec. 1, 1970

3,544,304
METHOD OF INCREASING THE NUMBER OF LATERAL BRANCHES IN PLANTS
Quentin F. Soper, Indianapolis, Ind., assignor to Eli Lilly and Company, Indianapolis, Ind., a corporation of Indiana
No Drawing. Continuation-in-part of application Ser. No. 647,199, June 19, 1967. This application July 9, 1969, Ser. No. 840,492
Int. Cl. A01n 9/24
U.S. Cl. 71—107          4 Claims

ABSTRACT OF THE DISCLOSURE

Atrolactic acid, mandelic acid and derivatives thereof increase the number of lateral branches in plants.

CROSS-REFERENCE

This application is a continuation-in-part of my co-pending application, Ser. No. 647,199, filed June 19, 1967, now abandoned.

BACKGROUND OF THE INVENTION

Many organic compounds are capable of stunting the growth of growing plants when applied thereto in the form of an emulsion or solution. A very few of these compounds accomplish this stunting by breaking apical dominance in the plant. A compound which can accomplish this result is said to have "anti-auxin" activity. Apical dominance can also be broken mechanically by the common action known as "pinching," which is used, for example, to increase flowering in chrysanthemums. The result of breaking apical dominance by pinching is to increase greatly the number of lateral branches in the plant without damage to the plant other than loss of the apical bud. Unfortunately, many compounds which are able to stunt plants and thus increase the number of lateral branches by breaking apical dominance also have extremely serious phytotoxic effects, particularly stunting. This fact is not too surprising when it is considered that the chemical breaking of apical dominance is an anti-hormonal effect and that these anti-hormonal effects tend to be general and not specific; that is, if the compound is able to break apical dominance by anti-hormonal action, this same anti-hormonal effect will disturb the growth of the plant in other ways. Thus, it is quite common to find with most organic compounds that there is an intolerable degree of burning, chlorosis, epinasty or stunting of the plant at compound application rates which give a statistically significant increase in the number of lateral branches.

Derivatives of mandelic and atrolactic acid in which the phenyl ring is chlorinated are said to be herbicidal (U.S. Pat. 3,277,160) or to be able to induce abscission [Weintraub et al. Botannical Gazette 113, 348 (1959); Plant Regulators CBCC, Positive Data Series, No. 2, Page 34] or to have plant growth regulating properties (British Pat. 1,032,879 and D.D.R. Pat. 48,596). Nothing in the prior art indicates that atrolactic acid, or the alkyl mandelic acids or their simple derivatives would have an anti-auxin action.

SUMMARY

This invention provides a method of increasing the number of lateral branches in plants by applying to the growing plant an effective amount of a compound represented by the formula

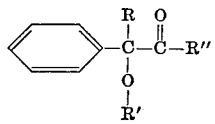

wherein R and R' are the same or different members of the group consisting of hydrogen, methyl or ethyl, provided that only one of R and R' can be hydrogen in the same molecule and R" is —OH, —OM, —O—alk, —NH$_2$ or —NH—NH$_2$, wherein M is an alkaline earth or alkali metal such as sodium, potassium, rubidium or cesium or an alkaline earth metal such as magnesium, calcium, barium or strontium, and alk is a C$_1$–C$_5$ alkyl group such as methyl, ethyl, isopropyl, n-propyl, isobutyl, n-butyl, sec.-butyl, n-pentyl, isopentyl, sec.-pentyl, neopentyl, 2-methyl-3-butyl or the like.

Compounds coming within the scope of the above formula include atrolactic acid, methyl atrolactate, α-ethyl-mandelic acid, atrolactamide, atrolactic acid hydrazide, ethyl 2-ethylmandelate, 2-methoxy-2-phenylacetic acid, methyl O-methylmandelate and the like. Compounds represented by the above formula are capable of increasing the number and growth of lateral branches in such plants as soybeans, strawberries, tomatoes, flax, pole beans, sesame, and forage legumes, when applied thereto in an effective amount. The purpose of increasing the number of lateral branches in many of these plants is to enable them to grow rapidly across an inter-row area so as to shade that area and thus prevent germination and growth of weeds therein. Lateral growth across the inter-row area is particularly useful in soybeans where, in years when the weather conditions are most favorable and there is rapid growth of soybeans quickly shading the inter-row areas, only one harrowing of the inter-row area is necessary, as opposed to 2 or 3 in normal years. In forage-type legumes, the problem is not one of keeping the inter-row areas weed free since the seeds of these plants are broadcast rather than planted in rows as soybeans are, but rather one of increasing the amount of foliage by encouraging the growth of lateral branches. Furthermore, in any of the plants in which apical dominance has been broken so as to increase the number of lateral branches, there is potentially a greater number of flowering sites with a potential concomitant increase in yield. However, factors other than simply the number of flowering sites available affect yields, and greater yields are not always procured with increased number of lateral branches.

It is a particular feature of the invention that there is an application rate for each compound represented by the above formula, at which rate it will markedly increase the number of lateral branches without substantial injury to the plant itself.

The ability of the compounds coming within the scope of the above formula to increase the number of lateral branches was first determined in the greenhouse in the following way: A soil was prepared consisting of one part masonry sand and one part shredded top soil blended together in a cement mixer. The soil was placed in plastic pots measuring 3⅝ by 3⅝ inches. Three soybean seeds were planted at a depth of 2½ cm. in each of these pots. When the soybeans had germinated and emerged, the beans were thinned to one plant per pot. Approximately three weeks after planting when the first trifoliate leaves were fully expanded and the second trifoliate leaves were ¼ to ½ expanded, the plants were treated with the compound under test at rates of 2500, 2000, 1500, 500, 250 p.p.m. or less. A rate of 2000 p.p.m. is equivalent to a rate of 6.74 pounds per acre and the other rates are in proportion. The compounds were applied in a spray volume of 400 gallons per acre, computing the surface area of the pot as a proportionate part of an acre, with a modified deVilbiss atomizer using a pressure of 10–12 p.s.i. Thus 3.2 ml. of the final solution was directed at the foliage of each plant. The compounds were prepared for spraying by dissolution in a non-phytotoxic solvent such as acetone followed by dilution with water to which 0.05 percent of a suitable wetting agent had been added.

In evaluating the results of this test the number of lateral branches were counted at each concentration and the phytotoxicity rated according to the following scale:

| Rating: | Phytotoxicity |
|---|---|
| 0 | None. |
| 1 | Slight. |
| 2 | Moderate. |
| 3 | Severe. |
| 4 | Death of plant. |

Table I which follows gives the results of these tests. In the table column 1 gives the name of the compound, columns 2–7 the results of tests at spray concentrations varying from 2500–125 p.p.m. Under the spray concentration the first column, L, gives the number of lateral branches and the second column, Ph, the phytotoxicity rating.

cone nozzles. The three application dates were June 17, June 30 and July 13, which dates were, as regards the growth state of the plant, the 2-leaf stage, very early bloom stage (5th trifoliate leaf fully expanded) and the midbloom stage (8th trifoliate leaf fully expanded), respectively. Twelve 30′ x 3′ sections were retained as control areas. Table II which follows gives the results of this test. In the table, column 1 gives the name of the compound, column 2 the application rate in p.p.m., column 3 the growth stage at which the plants were sprayed, column 4 the phytotoxicity rating using a toxicity rating scale in which 0 indicates no phytotoxicity, a 10 rating indicates death of the plant and intermediate ratings indicate degrees of damage between the two extremes, column 5 the number of lateral branches, column 6 the height in inches, column 7 the growth form rating according to the following scale:

TABLE I

| Compound | 2,500 L | 2,500 Ph | 2,000 L | 2,000 Ph | 1,000 L | 1,000 Ph | 500 L | 500 Ph | 250 L | 250 Ph | 125 L | 125 Ph |
|---|---|---|---|---|---|---|---|---|---|---|---|---|
| Methyl O-methylmandelate | 6 | 1 | | | 6 | 2 | 8 | 3 | 3 | 1 | 2 | 0 |
| dl-Atrolactamide | 6 | 2 | | | 5 | 0 | 7 | 1 | | | | |
| dl-α-Ethyl-mandelamide | 5 | 1 | | | 3 | 0 | 1 | 0 | | | | |
| Atrolactic acid hydrazide | 5 | 2 | | | 6 | 1 | 4 | 0 | 2 | 0 | | |
| dl-Atrolactic acid | 6 | 2 | | | 6 | 2 | 6 | 1 | 4 | 1 | | |
| (−) Atrolactic acid | 4 | 3 | | | | | 4 | 1 | | | | |
| dl-Ethyl 2-methoxy-2-phenylacetate | 6 | 2 | 5 | 2 | 4 | 2 | 3 | 2 | 4 | 0 | | |
| (+) Atrolactic acid | 5 | 2 | | | 4 | 1 | 5 | 0 | | | | |
| α-Methoxyphenyl-acetic acid, sodium salt | 6 | 2 | | | | | 4 | 1 | 2 | 0 | 1 | 1 |
| n-Propyl 2-methoxy-2-phenylacetate | 5 | 2 | 1 | 1 | 3 | 1 | 3 | 2 | | | | |
| n-Pentyl 2-methoxy-2-phenylacetate | 6 | 3 | | | 1 | 1 | 2 | 2 | 1 | 0 | 2 | 0 |
| 2-ethoxy-2-phenylacetic acid, sodium salt | 4 | 1 | | | 4 | 1 | 4 | 2 | 3 | 2 | 2 | 1 |
| L(+) methyl atrolactate | | | | | 3 | 0 | 3 | 0 | | | | |
| 2-methylmandelic acid | 4 | 1 | 3 | 1 | 2 | 1 | 2 | 1 | | | | |
| Atrolactic acid, sodium salt | 3 | 2 | 3 | 2 | 2 | 1 | | | | | | |

Methyl O-methylmandelate and atrolactic acid, both of which compounds were able in the greenhouse to increase the number of lateral branches of soybean plants without accompanying pyhtotoxic effects, were also tested in the field for the same effect. Soybeans, var. Harosoy, were planted on May 25 in rows 3′ x 30′. Six sections of 3′ x 30′ were treated with four concentrations each of the two chemicals at 3 different intervals after planting by spray—the plants in each area to run-off using a tractor-mounted $CO_2$ sprayer equipped with TeeJet solid

| | |
|---|---|
| 1 | No lateral branches. |
| 2 | Lateral branches less than ⅓ the height of the plant. |
| 3 | Lateral branches ⅓ to ⅔ the height of the plant. |
| 4 | Lateral branches greater than ⅔ the height of the plant. |
| 5 | Lateral branches reaching the crown of the plant. | and column 8 the yield.

TABLE II

| Compound | Rate, p.p.m. | Growth stage | Phytotoxicity | No. of lateral branches | Height, in. | Growth form rating | Yield |
|---|---|---|---|---|---|---|---|
| Methyl O-methylmandelate | 1,000 | 2-leaf | 3.5 | 3.4 | 33 | 4.8 | 29.1 |
| | 500 | do | 3.0 | 3.1 | 36 | 3.7 | 31.8 |
| | 125 | do | 1.5 | 1.9 | 36 | 4.0 | 32.7 |
| | 125 | do | 0 | 2.0 | 36 | 3.3 | 34.0 |
| Atrolactic acid | 2,000 | 2-leaf | 5.0 | 3.6 | 32 | 3.8 | 26.5 |
| | 1,000 | do | 3.5 | 3.6 | 35 | 5.0 | 28.3 |
| | 500 | do | 3.5 | 3.2 | 34 | 4.5 | 32.0 |
| | 250 | do | 1.0 | 2.4 | 36 | 3.7 | 34.0 |
| Methyl O-methylmandelate | 1,000 | Very early bloom | | | 32 | 4.3 | 32.8 |
| | 500 | do | | | 35 | 4.0 | 30.3 |
| | 250 | do | | | 37 | 3.2 | 21.4 |
| | 125 | do | | | 36 | 3.5 | 32.8 |
| Atrolactic acid | 2,000 | Very early bloom | | | 26 | 5.0 | 22.8 |
| | 1,000 | do | | | 29 | 4.8 | 28.6 |
| | 500 | do | | | 36 | 4.5 | 32.2 |
| | 250 | do | | | 36 | 3.2 | 28.0 |
| Methyl O-methylmandelate | 1,000 | Mid-bloom | | | 33 | 2.7 | 28.2 |
| | 500 | do | | | 35 | 3.3 | 30.9 |
| | 250 | do | | | 36 | 3.2 | 32.3 |
| | 125 | do | | | 38 | 3.0 | 28.8 |
| Atrolactic acid | 2,000 | Mid-bloom | | | 32 | 3.3 | 25.6 |
| | 1,000 | do | | | 34 | 3.0 | 32.8 |
| | 500 | do | | | 38 | 3.3 | 28.5 |
| | 250 | do | | | 37 | 3.2 | 33.6 |
| Control | 0 | | 0 | 1.6 | 37 | 3.0 | 29.5 |
| | 0 | | | 1.6 | 36 | 3.5 | 31.5 |
| | 0 | | 0 | | 35 | 2.7 | 35.7 |
| | 0 | | 0 | | 38 | 2.8 | 37.7 |

It can be seen from the results of the above field trial that application of either of the compounds at the 2-leaf stage increases the number of lateral branches. The total height of the plants was reduced by all application rates, which effect would be a benefit to soybean growers in that the shorter plants tend to be sturdier and would be more resistant to lodging. The growth form rating indicates that both compounds increased the length of lateral branches when applied at the first two growth stages.

Compounds represented by the above formula can also be applied in order to increase the number of lateral branches of plants as a soil drench to growing plants or by in-furrow application at planting time. In employing a soil drench as a method of applying the compounds, the application rates were 1–4 pounds per acre in 4000 gallons. Treatment of soybeans, var. Harosoy, 18 days after planting yielded from 4–7 lateral branches per plant with only minimal plant damage at all application rates. The greatest number of lateral branches were obtained at a 2 pounds per acre application rate, using methyl O-methylmandelate and dl-atrolactic acid as the antiauxin compounds.

In-furrow application of dl-atrolactic acid and methyl O-methylmandelate was accomplished by dispersing the compound on vermiculite, mixing the vermiculite with fertilizer (phosphorus and potassium), and placing the mixture between rows of soybeans, var. Harosoy, at the bottom of a one-inch deep furrow and then covering over the furrow. dl-Atrolactic acid, when applied at rates of 2, 4, and 8 pounds per acre, increased the number of lateral branches with minimal damage to the plants.

Compounds represented by the above formula can be formulated for use as emulsifiable concentrates, wettable powders, dispersions on vermiculite, fertilizer or other inert carrier or in other ways commonly used in good agronomical practice. Typical emulsifiable concentrates contain the following ingredients:

Formulation I

| | Percent |
|---|---|
| dl-Atrolactic acid | 17.6 |
| Nonylphenoxypolyethoxyethanol (with 10 ethoxy residues per molecule) | 5.85 |
| Dimethylsulfoxide | 42.1 |
| Xylenes | 33.78 |

Formulation II

| | Percent |
|---|---|
| Methyl O-methylmandelate | 49.23 |
| Dispersant | 6.15 |
| Xylenes | 42.26 |

Useful dispersants for the above formulations include a mixture of the calcium salt of benzene dodecylsulfonate and either a polyoxyethylene ether of nonylphenol containing 9 ethylenoxide residues in the polyoxyethylene chain or a polyoxyethylene-sorbitan mono-oleate.

The above formulations are diluted with sufficient water to yield the desired application rate which can vary from about 0.425 pound per acre (125 p.p.m.) to about 8.5 pounds per acre (2500 p.p.m.).

Compounds represented by the above formula have either been well known in the art for a long time or the processes by which they can be prepared have been known for a long time. Compounds related to atrolactic acid are described in Beilstein 10, 259–69 and supplements and compounds related to mandelic acid in Beilstein 10, 192–202 and supplements.

I claim:

1. A method of increasing the number of lateral branches in plants which comprises applying to the plant an effective amount of a compound represented by the formula

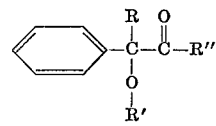

wherein R and R' are the same or different members of the group consisting of hydrogen, methyl or ethyl provided that only one of R and R' can be hydrogen and R'' is —OH, —OM, —O—alk, —NH$_2$ or —NH—NH$_2$, wherein M is an alkaline earth or alkali metal, and alk is a $C_1$–$C_5$ alkyl group.

2. The process according to claim 1 in which the compound is atrolactic acid.

3. The process according to claim 1 in which the compound is methyl O-methylmandelate.

4. The process according to claim 1 in which the compound is applied at the rate of from 0.425 to 8.5 pounds per acre.

References Cited

UNITED STATES PATENTS 3,277,160  10/1966  Weil et al. _____ 71—107 X
3,377,155  4/1968   Weil et al. _____ 71—107 X

OTHER REFERENCES

"Plant Regulators," CBCC Positive Data Series No. 2, National Academy of Sciences, pp. a, b, c, and 34.

JAMES O. THOMAS, JR., Primary Examiner

U.S. Cl. X.R.

71—115, 118, 121